(12) United States Patent
Futral et al.

(10) Patent No.: US 6,317,799 B1
(45) Date of Patent: *Nov. 13, 2001

(54) DESTINATION CONTROLLED REMOTE DMA ENGINE

(75) Inventors: William T. Futral, Portland; D. Michael Bell, Beaverton, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/561,287

(22) Filed: Apr. 28, 2000

Related U.S. Application Data

(62) Division of application No. 08/990,903, filed on Dec. 15, 1997.

(51) Int. Cl.[7] .............................. G06F 13/00; G06F 12/00; G06F 15/16

(52) U.S. Cl. ................................. 710/22; 710/9; 710/23; 710/24; 710/26; 710/27; 710/31; 709/212

(58) Field of Search .................................. 710/9, 22, 23, 710/24, 26, 27, 31; 709/212

(56) References Cited

U.S. PATENT DOCUMENTS

| 4,371,932 | 2/1983 | Dinwiddie, Jr. et al. | 364/200 |
|---|---|---|---|
| 4,805,137 | 2/1989 | Grant et al. | 364/900 |
| 4,878,166 | 10/1989 | Johnson et al. | 364/200 |
| 4,901,232 | 2/1990 | Harrington et al. | 364/200 |
| 5,003,465 | 3/1991 | Chisholm et al. | 364/200 |
| 5,175,825 | 12/1992 | Starr | 395/325 |
| 5,404,463 | 4/1995 | McGarvey | 395/325 |
| 5,475,860 | 12/1995 | Ellison et al. | 395/846 |
| 5,634,099 | 5/1997 | Andrews et al. | 395/200 |
| 5,881,248 | 3/1999 | Mergard | 395/280 |
| 5,890,012 | 3/1999 | Poisner | 395/842 |
| 5,954,802 | 9/1999 | Griffith | 710/22 |
| 5,968,143 | 10/1999 | Chisholm et al. | 710/23 |
| 5,968,144 | 10/1999 | Walker et al. | 710/28 |
| 6,000,043 | 12/1999 | Abramson | 714/44 |
| 6,081,851 | * 6/2000 | Futral et al. | 710/23 |

* cited by examiner

Primary Examiner—Rupal Dharia
(74) Attorney, Agent, or Firm—Blakley, Sokoloff, Taylor & Zafman LLP

(57) ABSTRACT

The invention, in one embodiment, is a method for accessing memory. The method includes programming a remote DMA engine from a destination; accessing data in the memory with the DMA engine, the DMA engine operating as programmed by the destination; and transferring the accessed data to the destination.

25 Claims, 6 Drawing Sheets

DESTINATION CONTROLLED REMOTE DMA ENGINE

This is a divisional of application Ser. No. 08/990,903, filed on Dec. 15, 1997, that has been allowed to issue.

BACKGROUND OF THE INVENTION

1. Field of the Invention

This invention relates generally to memory access and, more particularly, to a destination controlled remote direct memory access ("DMA") engine.

2. Description of the Related Art

One important component in a computer's performance is the efficiency with which it accesses memory. Most, if not all, instructions that a computer executes require the computer's processor to either write or read data from memory. Thus, the more efficiently the computer accesses data in memory, the better the computer's overall performance. It is also therefore important that a computer both read from and write to memory efficiently since both operations limit the computer's performance. Gains in performance can consequently be obtained by improving the efficiency of either reading or writing.

FIG. 1 illustrates a particular computer's prior art memory and input/output ("I/O") subsystem 10. The subsystem 10 is constructed and operates in accord with an industry standard known as the Peripheral Component Interface ("PCI") specification. The subsystem 10 includes a memory 12 that receives and transmits data over a host bus 14. To facilitate data transfer during I/O operations, the subsystem 10 includes a host/PCI bridge 16 between the host bus 14 and a PCI bus 18. The PCI bus 18 provides a communications mechanism permitting a variety of peripheral components (not shown) to conduct their business without slowing operations on the host bus 14.

The peripheral components in the subsystem 10 are I/O devices, such as a monitor, a keyboard, a mouse, or a printer, that interface with the PCI bus 18 through I/O adapters 20. As used hereafter, the term "I/O adapter" shall mean either an I/O device or an interface to an I/O device. As shown in FIG. 1, there are several I/O adapters 20, each of which must transact its business on the PCI bus 18, but only one can do so at a time. The individual I/O adapters 20 arbitrate among themselves and the host/PCI bridge 16 in between transactions to see who will control the PCI bus 18 for the next transaction. Once an individual I/O adapter 20 wins the arbitration and controls the PCI bus 18, it can access the memory 12 through the host/PCI bridge 16 over the PCI bus 18 and the host bus 14.

To write data to an I/O adapter 20, an initiating device (not shown), such as a processor, puts the data on the host bus 14. The host bus 14 then receives the data and writes it to a write buffer 24 of the host/PCI bridge 16. The host/PCI bridge 16 then arbitrates for control of the PCI bus 18 and, upon receiving control, writes the data to the I/O adapter 20. The host/PCI bridge 16 then relinquishes control of the PCI bus 18.

To read data from the memory 12, an individual I/O adapter 20 wins control of and then issues a read transaction on the PCI bus 18. The host/PCI bridge 16 receives the read transaction. Upon receiving the read transaction, the host/PCI bridge 16 signals the I/O adapter 20 to retry at a later time, reserves a read buffer 22 for use in the read transaction, and queues a memory access request to fetch the data from the memory 12 over the host bus 14. The I/O adapter 20 then relinquishes control of the PCI bus 18. When the host/PCI bridge 16 receives the data, it writes the data in the reserved read buffer 22. The I/O adapter 20, in the meantime, periodically retries getting the data from the host/PCI bridge 16, each retry requiring the I/O adapter 20 to win control of the PCI bus 18. Eventually, the host/PCI bridge 16 has the data in its read buffer 22. The I/O adapter 20 then receives the data from the host/PCI bridge 16 whereupon the host/PCI bridge 16 releases the reserved read buffer 22 and the I/O adapter 20 relinquishes control of the PCI bus 18.

Thus, there are at least two technological problems with the structure and operation of the subsystem 10 in FIG. 1. First, there is a great disparity between reads and writes for the I/O adapters 20 in the efficiency with which the resources of the subsystem 10 are used. Second, the design does not scale well in the sense of adding I/O adapters 20 and PCI buses 18 and 28 to expand the I/O subsystem.

More particularly, for the read transaction, a read buffer 22 must be reserved for the entire read transaction. Also, there are many more arbitrations for control of the PCI bus 18 for reads than there are for writes. This disparity is compounded for a read by an I/O adapter 26 by the necessity to operate over the PCI bus 28 and through the PCI/PCI bridge 32. When the number of I/O adapters 20 and 26 performing reads exceeds the number of available read buffers 22 in the bridges 16 and 32, additional latency is incurred before the bridges 16 and 32 can even forward the read requests to the host bus 14. When additional PCI/PCI buses 28 are added to expand the I/O subsystem, latencies are accumulated since each bridge 32 must reserve a read buffer 22 from its parent bridge 16, competing with all other bridges and I/O adapters on the PCI/PCI bridge 32's primary bus. For a single read to complete, a read buffer 22 in each bridge 16 and 23 is consumed and, when a read buffer 22 is not available, the transaction stalls. Since each bridge 16 and 32 has a limited number of read buffers 22, the subsystem 10 does not scale well.

The present invention is directed to overcoming, or at least reducing the effects of, one or more of the problems set forth above.

SUMMARY OF THE INVENTION

The invention, in one embodiment, is a method for accessing memory. The method includes programming a remote DMA engine from a destination; accessing data in the memory with the DMA engine, the DMA engine operating as programmed by the destination; and transferring the accessed data to the destination.

BRIEF DESCRIPTION OF THE DRAWINGS

Other objects and advantages of the invention will become apparent upon reading the following detailed description and upon reference to the drawings in which.

Figure 1:
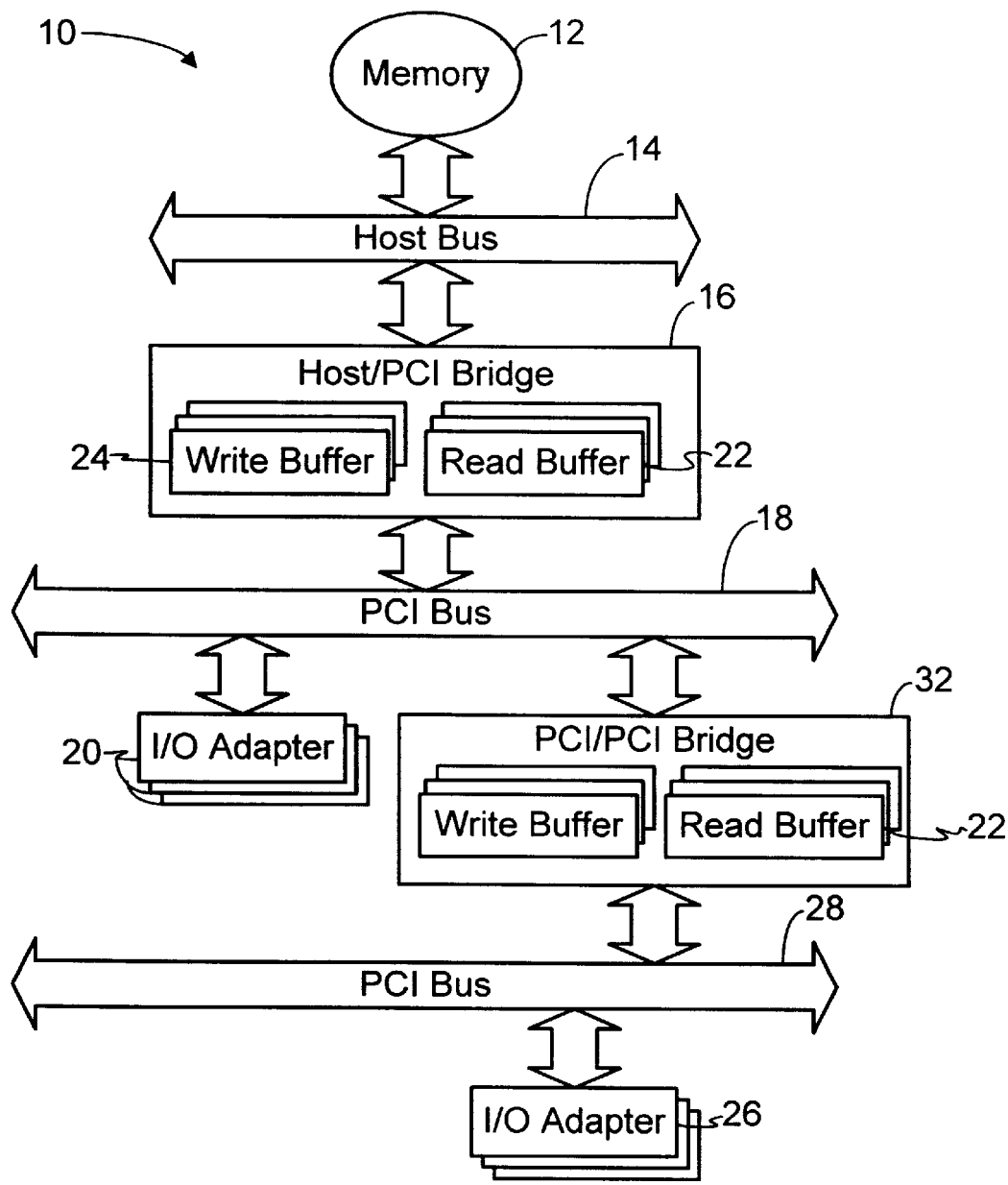
FIG. 1 depicts a prior art I/O and memory subsystem.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
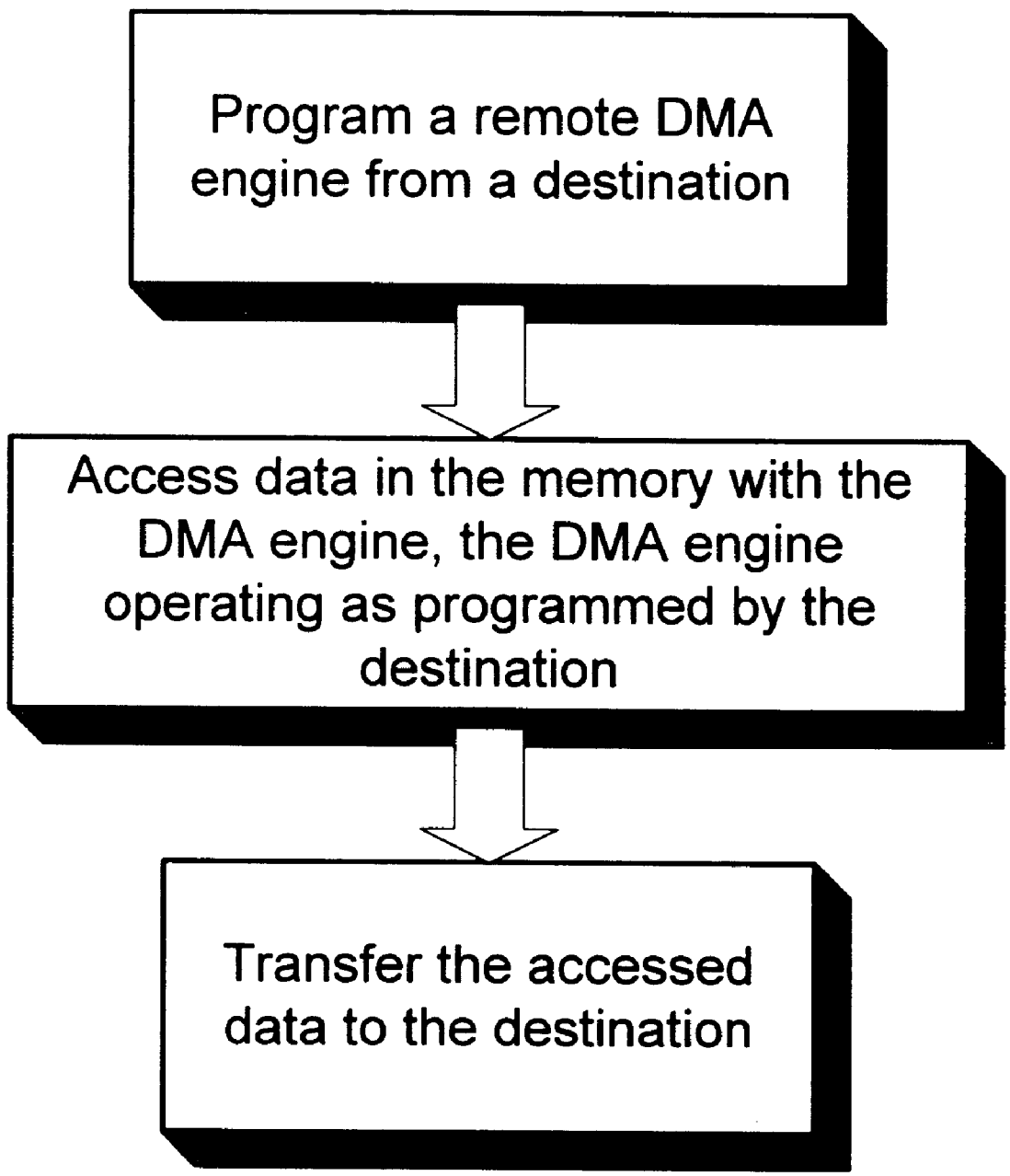
FIG. 2 illustrates one embodiment of a method for remotely controlling a remote DMA engine from a destination in accordance with the invention.
Figure 3:
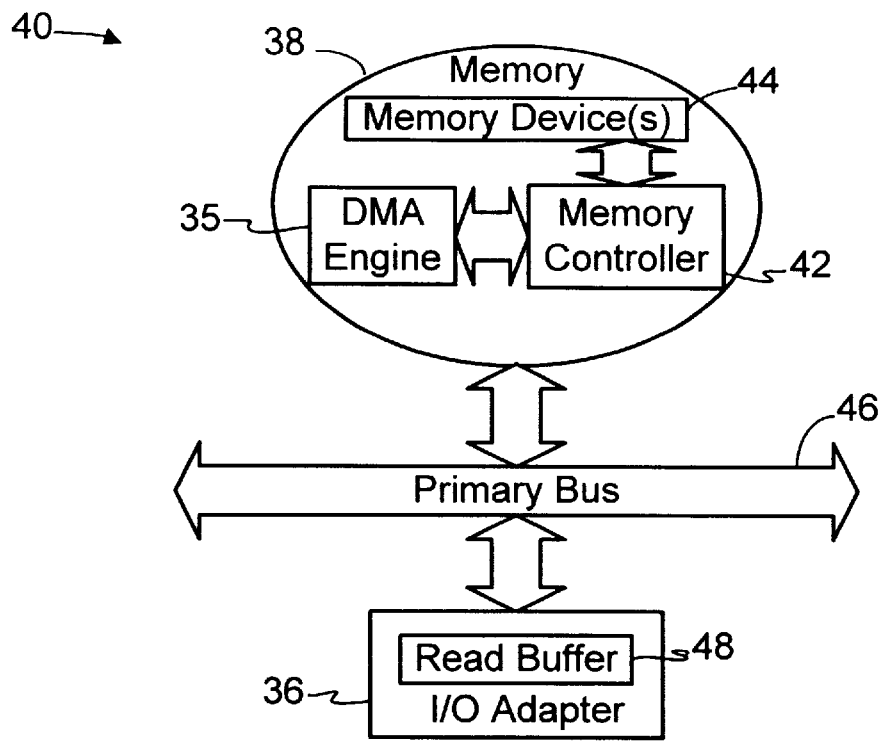
FIG. 3 depicts one embodiment of an apparatus with which the method of FIG. 2 may be implemented to remotely control a DMA engine from a destination.

Referring now to FIGS. 2 and 3, FIG. 2 illustrates one embodiment of a method for remotely controlling a remote DMA engine 35 from a destination I/O adapter 36 in accordance with the invention. "DMA" is a memory access commonly known in the art wherein, in this context, the I/O system writes directly to memory without involving a processor. In conventional computer designs, as opposed to the present invention, the computer includes a DMA controller housing a DMA engine programmed by a processor. The DMA engine then controls all DMA operations in the computer as programmed by the processor.

FIG. 3 depicts one embodiment of an apparatus 40 with which the method of FIG. 2 may be implemented as set forth below. The method of FIG. 2 begins by programming a remote DMA engine 35 from a destination I/O adapter 36. The DMA engine 35 then accesses data stored in a memory 38, the DMA engine 35 operating as programmed by a destination I/O adapter 36. Once the data is accessed, it is transferred to the destination I/O adapter 36.

More particularly, and referring only to FIG. 3, the memory 38 includes a memory controller 42 and one or more memory devices 44. The memory controller 42 receives commands and data and transmits data over a primary bus 46 in accord with conventional practice. The memory controller 42 also receives commands and data from the DMA engine 35 and transmits data to the DMA engine 35 in accord with the present invention. The memory controller 42, in response to commands, reads or writes data to or from, respectively, the memory devices 44. As those in the art will appreciate, the operation and structure of the memory controller 42 will depend greatly on the type and organization of the memory devices 44.

The memory devices 44 may be any type of random access memory ("RAM") known to the art. Exemplary memory types are the dynamic random access memories ("DRAM") such as, but not limited to, synchronous DRAM ("SDRAM"), fast page mode RAM ("FPM RAM"), extended data out DRAM ("EDO DRAM"), burst EDO DRAM ("BEDO DRAM"), video RAM ("VRAM"), Rambus DRAM ("RDRAM"), synchronous graphic RAM ("SGRAM"), SyncLink DRAM ("SLDRAM"), and window RAM ("WRAM"). The memory devices 44 may also be organized in any suitable fashion known to the art. The memory devices 44 may be banked in a simply interleaved or a complexly interleaved memory organization as are known in the art. However, to a large degree, the organization of the memory devices 44 will be implementation specific.

The DMA engine 35 in the particular embodiment of FIG. 3 resides in the memory 38 although this is not necessary to the practice of the invention. The DMA engine 35 is remote from the I/O adapter 36 in that it does not reside in the I/O adapter 36. The I/O adapter 36 must consequently communicate with the DMA engine 35 over the primary bus 46. DMA engines are well known and any DMA engine known to the art may be used to implement the DMA engine 35. Some embodiments might, for instance, employ the DMA engine in the core of the Intel® 8237 DMA controller or that in the core of the Intel® 960 chipset.

The bus 46 implements a bus protocol in which a physical address is asserted thereon to write to and read from the memory 38. Exemplary bus protocols meeting this requirement are the peripheral component interface ("PCI") bus protocol and the small component serial interface ("SCSI") bus protocol. However, the invention is not limited to these exemplary protocols.

Figure 4:
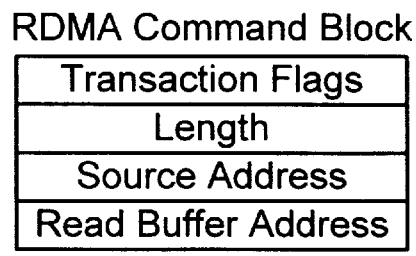
FIG. 4 illustrates a DMA command block such as might be written to a DMA engine in one embodiment of the invention.

Referring again to both FIGS. 2 and 3, the destination I/O adapter 36 programs the DMA engine 35. In one embodiment, the destination I/O adapter 36 programs the DMA engine 35 by writing a DMA command block thereto. FIG. 4 illustrates a DMA command block such as might be written to the DMA engine 35 to program it. As will be appreciated by those in the art, the structure of the DMA command block will depend to some degree on the specific implementation of the DMA engine 35. However, the DMA command block in FIG. 4 is fairly representative.

The command block illustrated in FIG. 4 includes four sections, one each for the transaction flags, the length, the source address, and the read buffer address for the DMA transaction. The transaction flags specify attributes of the DMA operation. The length section specifies the amount of data to transfer. The source address section specifies the location of the first piece of data in the memory 38. Finally, the read buffer address specifies where the DMA engine 35 is to write the data transferred.

Alternatively, the destination I/O adapter 36 might write a DMA command block to the memory 38 rather than the DMA engine 35. The destination I/O adapter 36 may then program the DMA engine 35 with a pointer to the location in the memory 38 where the DMA command block is stored. The structure of such a stored DMA command block might include, in addition to the four parts of the DMA command block in FIG. 4, a pointer to a second stored DMA command block. The destination I/O adapter 36 in such an embodiment may therefore be able to store a number of DMA command blocks in such a linked list and program the DMA engine 35 with a vector to the linked list.

Returning to FIG. 2, the DMA engine 35, once programmed, accesses data in the memory 38, shown in FIG. 3, in accordance with the program. The DMA engine 35 issues a stream of access requests to the request queue (not shown) of the memory controller 42. One access request is issued by the DMA engine 35 for each address specified by the source address and the stream length specified in the command block with which the DMA engine 35 is programmed.

In the particular embodiment illustrated, the memory 38 transfers the specified data to a write buffer (not shown) associated with the DMA engine 35 to complete the access. However, the invention is not so limited. The DMA engine 35 might alternatively instruct the memory controller 42 to transfer data directly to the destination I/O adapter 36. Some conventional memory controllers 42 have insufficient capabilities for use in this alternative embodiment although many others do. Thus, this aspect of the invention is implementation specific.

Once again referring to FIG. 2, the accessed data is then transferred to the destination I/O adapter 36. In the embodiment illustrated, once the memory controller 42 processes each of the requests in the request queue and transfers the specified data to the write buffer of the DMA engine 35, the DMA engine 35 writes the data to the read buffer 48 of the destination I/O adapter 36 over the primary bus 46. The DMA engine 35 receives the address of the read buffer 48 as specified in the DMA command block with which the DMA engine 35 is programmed.

Figure 5:
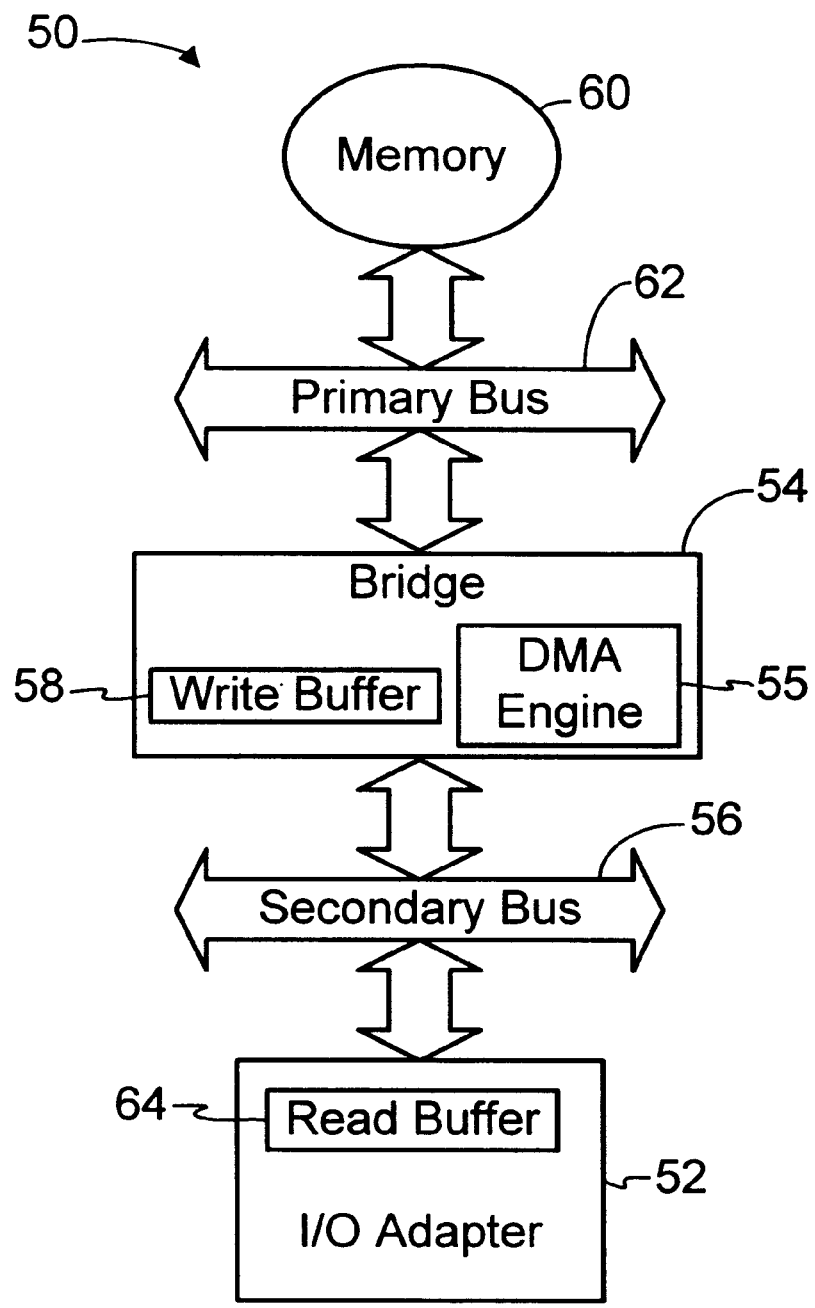
FIG. 5 depicts an apparatus alternative to that of FIG. 3 with which the method of FIG. 2 may be implemented.
Figure 6:
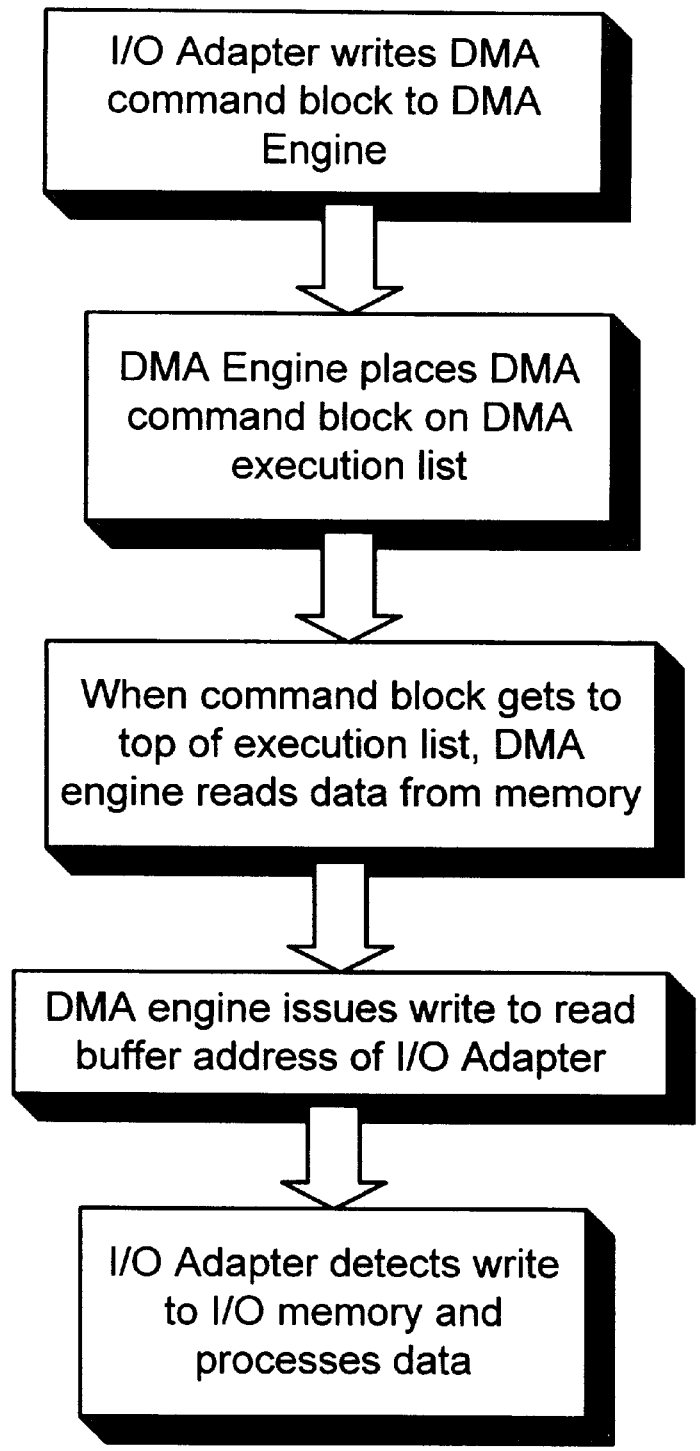
FIG. 6 illustrates a second embodiment of the method for controlling a DMA engine from a destination in accord with the present invention.

FIG. 5 depicts an apparatus 50 with which the method of FIG. 6 may be used to implement the present invention in an alternative embodiment. In the particular embodiment of FIG. 5, a destination I/O adapter 52 communicates with a bridge 54 over a secondary, or I/O, bus 56. The secondary bus 56 in this particular embodiment is a PCI bus and the bridge 54 is a host/PCI bridge, meaning the apparatus 50 implements a PCI bus protocol. A DMA engine 55 resides in the bridge 54 and issues access requests to a memory controller (not shown) of a memory 60 over a primary bus 62 in accord with its programming. The primary bus 62 is a host bus.

Referring now to both FIGS. 5 and 6, the I/O adapter 52 writes a DMA command block such as the one in FIG. 4, to the DMA engine 55 residing in the bridge 54 over the secondary bus 56. The address of the DMA engine 55 to which the command block is written is a "well known address," ie., an address that is not a configuration parameter. However, the invention is not so limited as the address of the DMA engine 55 may be a configuration parameter in some alternative embodiments. The command block is then put on the DMA execution list, which is a queue of DMA commands awaiting processing by the DMA engine 55.

Figure 7:
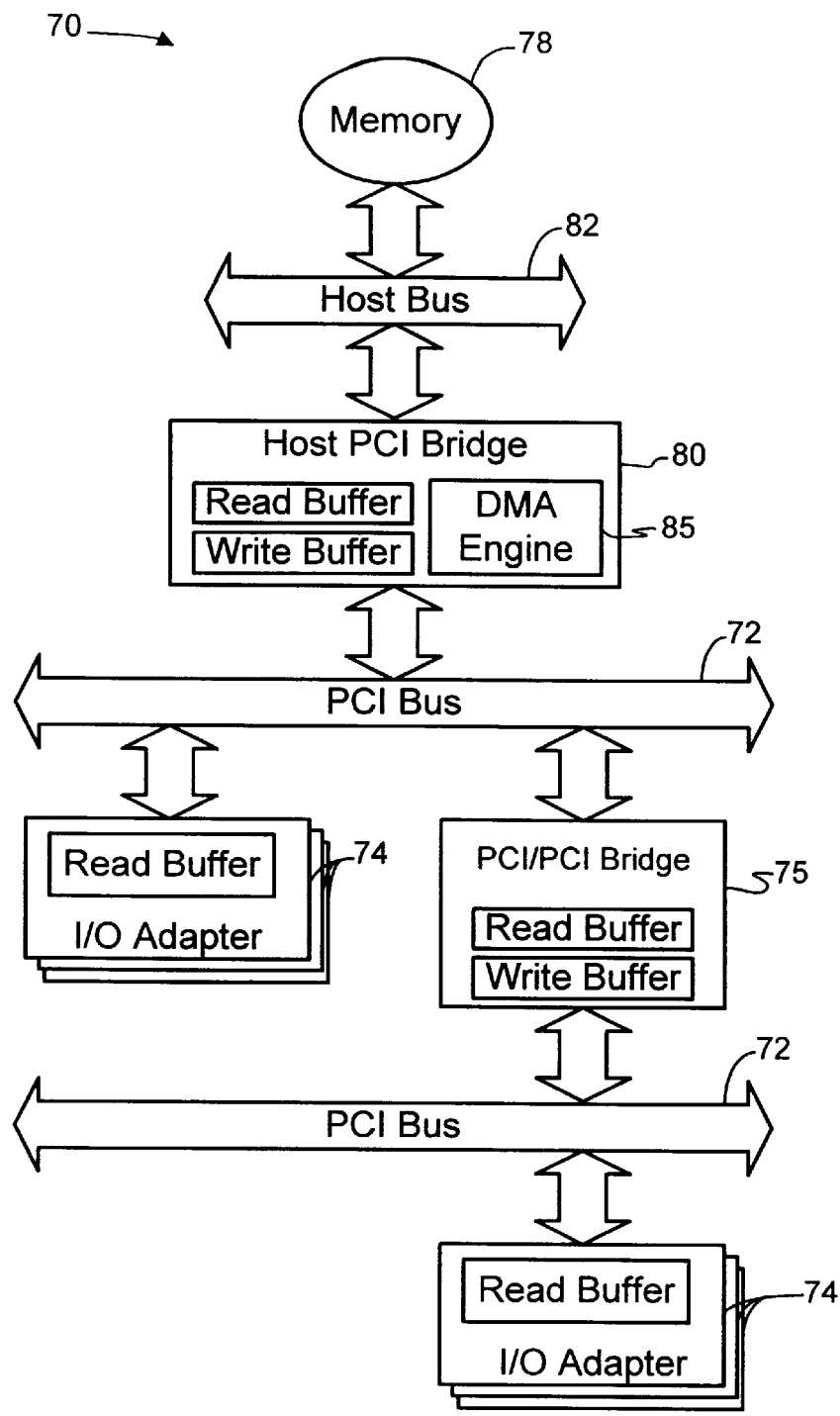
FIG. 7 depicts a variation on the embodiment of FIG. 5.

When the command block reaches the top of the execution list for the DMA engine 55, the DMA engine 55 processes it and reads the data from the memory 60. The memory controller (not shown) of the memory 60 transfers the data to the write buffer 58 associated with the DMA engine 55. The DMA engine 55 then writes the data to the read buffer 64 of the I/O adapter 52. The I/O adapter 52 detects the write to the read buffer 64 in accord with conventional practice and processes the data FIG. 7 depicts an apparatus 70 that is a variation on the embodiment of FIG. 5. FIG. 7 illustrates one application of the invention to highlight several of its advantages. The embodiment of FIG. 7 includes cascaded I/O buses 72 employing a PCI protocol and joined by a PCI/PCI bridge 75. Multiple I/O adapters 74 reside on and transact over the PCI buses 72. The I/O adapters 74 must access a memory 78 through a host/PCI bridge 80 over a host bus 82. A DMA engine 85 resides in the host/PCI bridge 80. The I/O adapters 74 on the buses 72 must arbitrate among themselves, the PCI/PCI bridge 75, and the host/PCI bridge 80 for bus ownership to transact their business thereon.

The DMA engine 85 is remote from all I/O adapters 74 and is placed high enough in the I/O channel so that all I/O adapters 74 may access the memory 78 although this is not necessary for the practice of the invention. In this manner, all I/O adapters 74 reap the performance gains of using the remote DMA engine 85. The remote DMA engine 85 may be employed, in some embodiments, in the PCI/PCI bridge 75 or in both the PCI/PCI bridge 75 and the host/PCI bridge 80. However, performance gains achievable using the present invention may be maximized by placing a single DMA engine as close to the memory as possible. Thus, removing the DMA engine 85 in the embodiment of FIG. 7 to the memory 78, as in the embodiment of FIG. 3, may improve the performance of the apparatus 70.

The invention's performance gains are generally attributable to the replacement of read transactions with write transactions. Using the invention, the I/O adapters 74 in FIG. 7 write to the DMA engine 85, which writes back to the I/O adapters 74 rather than I/O adapters 74 reading from the memory 78. The invention thereby minimizes the performance restrictions inherent in the disparity of efficiencies between write and read transactions as discussed above in connection with FIG. 1. Further, by utilizing more efficient writes instead of reads, the present invention reduces the amount of bandwidth consumed by memory access operations.

The invention harbors many other advantages. For instance, it provides scalability for I/O adapters while increasing available bandwidth relative to the number of I/O adapters. This, in tun, provides servers with I/O scalability. Implementation of the invention also is compatible with current technology. For instance, the invention can be implemented in a PCI bus environment, such as the one in FIG. 7, while operating in full accord with the PCI specification.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for accessing memory, the method comprising:
   programming a remote DMA engine residing on a first bus from a destination residing on the first bus;
   accessing data in a memory with the DMA engine, the DMA engine being embedded in the memory and operating as programmed by the destination; and
   transferring the accessed data by the DMA engine to the destination.

2. The method of claim 1, wherein accessing the data includes transferring the data to a write buffer associated with the DMA engine.

3. The method of claim 1, wherein transferring the accessed data includes transferring the data directly to the destination.

4. The method of claim 1, wherein programming the engine includes writing a DMA command block from the destination to the engine.

5. The method of claim 1, wherein programming the engine includes:

writing a DMA command block from the destination to the memory; and writing a pointer to the command block from the destination to the DMA engine.

6. The method of claim 5, wherein accessing data in the memory includes:

placing the DMA command block on the DMA engine's execution list; and when the command block reaches the top of the execution list, reading the specified data from the memory.

7. The method of claim 1, wherein accessing data in the memory includes:

placing the DMA command block on the DMA engine's execution list; and when the command block reaches the top of the execution list, reading the specified data from the memory.

8. The method of claim 1, wherein transferring the accessed data includes:

issuing a write to a read buffer address for the destination; and detecting the write to the read buffer address.

9. A method for accessing memory, the method comprising:

writing a DMA command block from an I/O adapter residing on a first bus to a remote DMA engine being embedded in the memory and residing on the first bus;

placing the DMA block on the DMA engine's execution list;

when the command block reaches the top of the execution list, reading data from the memory;

issuing a write from the DMA engine to a read buffer address for the I/O adapter;

detecting the write to the read buffer address; and processing the data.

10. The method of claim 9, wherein writing the DMA command block includes writing a DMA command block specifying at least one of the attributes of the operation, the amount of data to transfer, the location in memory of the data to transfer, and the address to which the DMA engine is to write the data.

11. The method of claim 9, wherein reading data from the memory includes:

generating a series of access requests from the DMA engine to a memory controller for the memory;

processing the access requests; and writing the data read from the memory to a write buffer associated with the DMA engine.

12. The method of claim 9, wherein reading data from memory includes writing the data from memory to a write buffer associated with the DMA engine.

13. An apparatus comprising:

a memory;

a plurality of buses;

a DMA engine being embedded in the memory and residing on a first of the plurality of buses;

an I/O adapter including a read buffer, the I/O adapter residing on the same first of the plurality buses, and being capable of programming the DMA engine over the first of the plurality of buses.

14. The apparatus of claim 13, wherein the DMA engine is capable of writing data to the read buffer of the I/O adapter.

15. The apparatus of claim 13, wherein the bus implements at least one of a PCI protocol and a SCSI protocol.

16. The apparatus of claim 13, wherein the memory includes at least one DRAM device.

17. The apparatus of claim 13, wherein the memory includes memory devices that are at least one of simply interleaved and complexly interleaved.

18. An apparatus comprising:

a plurality of buses;

an I/O adapter having a read buffer, the I/O adapter residing on a first of the plurality of buses;

a memory;

a DMA engine remote from and programmable by the I/O adapter, the DMA engine being embedded in the memory and residing on the first of the plurality of buses, and being capable of writing data read from the memory to the read buffer in accordance with a programmed command received from the I/O adapter.

19. The apparatus of claim 18, wherein the bus implements at least one of a PCI protocol and a SCSI protocol.

20. The apparatus of claim 18, wherein the memory includes at least one DRAM device.

21. The apparatus of claim 18, wherein the memory includes memory devices that are at least one of simply interleaved and complexly interleaved.

22. An apparatus comprising:

a plurality of buses;

an I/O adapter having a read buffer, the I/O adapter residing a first of the plurality of buses;

a memory including a memory controller;

a DMA engine remote from and programmable by the I/O adapter, the DMA engine being embedded in the memory and residing on the first of the plurality of buses, and being capable of instructing the memory controller to write data read from the memory to the read buffer in accordance with a programmed command received from the I/O adapter.

23. The apparatus of claim 22, wherein the bus implements at least one of a PCI protocol and a SCSI protocol.

24. The apparatus of claim 22, wherein the memory includes at least one DRAM device.

25. The apparatus of claim 22, wherein the memory includes memory devices that are at least one of simply interleaved and complexly interleaved.

* * * * *